United States Patent [19]

Bravet et al.

[11] Patent Number: 4,672,001

[45] Date of Patent: Jun. 9, 1987

[54] ADHESIVE LAYER USED IN THE MANUFACTURE OF LAMINATED GLASSES AND LAMINATED GLASSES COMPRISING SUCH A LAYER

[75] Inventors: Jean-Louis Bravet, Thourotte; Gerard Daude, Villeneuve D'Ornon, both of France

[73] Assignee: Saint-Gobain Recherche, Aubervilliers, France

[21] Appl. No.: 845,560

[22] Filed: Mar. 28, 1986

[30] Foreign Application Priority Data

Mar. 28, 1985 [FR] France ................................ 85 04645

[51] Int. Cl.$^4$ ............................................ B32B 27/00
[52] U.S. Cl. .................................. 428/425.6; 428/442; 525/415; 525/440; 525/462; 525/920; 528/75; 528/49
[58] Field of Search ............................ 428/425.6, 423.1; 525/415, 920, 440, 462, 130; 528/75, 49

[56] References Cited

U.S. PATENT DOCUMENTS

| | | | |
|---|---|---|---|
| 3,823,051 | 7/1974 | Chang | 156/99 |
| 4,039,720 | 8/1977 | Cherenko et al. | 428/425.6 |
| 4,592,947 | 6/1986 | Hunter et al. | 428/425.6 |

FOREIGN PATENT DOCUMENTS

| | | | |
|---|---|---|---|
| 2303835 | 1/1980 | France . | |
| 2184925 | 3/1981 | France . | |
| 1305624 | 2/1973 | United Kingdom | 428/425.6 |

*Primary Examiner*—Edith Buffalow
*Attorney, Agent, or Firm*—Oblon, Fisher, Spivak, McClelland & Maier

[57] ABSTRACT

An adhesive layer used in the manufacture of laminated glasses. The layer comprises a cold-polymerizable polyurethane formed from an isocyanate component selected from among the aliphatic isocyanates, cycloaliphatic isocyanates, and aliphatic-aromatic isocyanates, from a polyol component comprising at least one long polyol, at least one short diol and at least one monoalcohol with a molecular weight of less than 300 with a double ethylene bond in its formula and at least one polymerization initiator.

10 Claims, No Drawings

ADHESIVE LAYER USED IN THE MANUFACTURE OF LAMINATED GLASSES AND LAMINATED GLASSES COMPRISING SUCH A LAYER

BACKGROUND OF THE INVENTION

1. Field of the Invention

The present invention relates to the manufacture of laminated glasses in glass and/or plastic such as laminated glasses in large sizes, e.g., glasses for automobiles and buildings, and in smaller sizes, such as masks, screens, eyeglasses, etc. More especially, the invention relates to a new adhesive layer used in the manufacture of such laminated glasses. It further relates to laminated glasses comprising said adhesive layer.

2. Description of the Prior Art

The use of a polyurethane layer as an adhesive layer in laminated glasses is well known and is described in numerous patent publications. This layer can provide the sole function of adhesion. It can also have a role as an energy absorber.

This adhesive layer can be used to assemble sheets of various glass and/or plastic substances.

For example, French Patent Publication No. 2 398 606 describes the use of a thermoplastic polyurethane layer for the ahesion, with a glass or plastic support, of a self-repairing plastic layer, that is a layer from which local impressions disappear spontaneously after a short period of time, on the order of a few minutes, said speed of disappearance being a function of the type of impression and the temperature of the plastic. At the same time, this layer can be non-lacerating, that is that in the case of breakage of a glass pane, the layer covers the sharp eges of the glass and protects the face, eyes or other parts of the body of passengers in a vehicle, for example, or further in the case of safety eyeglasses, the protective layer can prevent sharp edges from contacting the eyes.

The assembly of the self-occluding and non-lacerating plastic layer with the support by means of the thermoplastic layer is carried out by means of heat and pressure, for example by subjecting the laminate to an autoclave cycle.

European Patent Publication No. 0 032 329 describes the use of a thermoplastic polyurethane-based adhesive layer containing a blocking agent. Here again, when this layer is used to manufacture laminated glasses, particularly to join the self-repairing and nonlacerating plastic layer to a rigid support, heat and pressure must be used, for example by subjecting the assembly to an autoclave cycle at a temperature greater than 110° C.

In addition, in this prior art, the manufacture of the adhesive layer necessitates the use of heat for the polymerization of the polyurethane.

The invention proposes an adhesive layer formed from a cold-polymerizable adhesive composition, that is one which is polymerizable at a temperature generally below 80° C. The adhesive layer in accordance with the invention comprises a polyurethane formed from an isocyanate component selected from among the aliphatic isocyanates, the cycloaliphatic isocyanates, and the aliphatic-aromatic isocyanates which are not light-sensitive and which may contain urea functions or even isocyanate biurets, a polyol component comprising at least one polyol selected from among the polyetherpolyols or the polyesterpolyols with a molecular weight of between 450 and 2,000, the polycaprolactones with a molecular weight of between 500 and 2,000, polycarbonatepolyols and polyestercarbonatepolyols with a molecular weight of between 1,000 and 2,000, polybutadienes with a hydroxyl or carboxyl function, at least one short diol with a molecular weight of between 50 and 200, at least one mono-alcohol with a molecular weight of less than 300 with a double ethylene bond in its formula and at least one polymerization initiator.

In particular, one may use, for example, as the isocyanate difunctional, aliphatic isocyanats, such as 1,6-hexanediisocyanate, 2,2,4-trimethyl-1,6-hexanediisocyanate, 2,4-4-trimethyl-1,6-hexanediisocyanate, 1,3-bis-(isocyanatomethyl)-benzene, bis-(4-isocyanatocyclohexyl)-propane and 3-isocyanatomethyl-3,5,5-trimethylcyclohexylisocyanate, p-phenylenediisocyanate and p-cyclohexyldiisocyanate.

As polyols, the polyols obtained by reaction of polyfunctional alcohols with aliphatic diacids or cyclic ethers are used. The polyfunctional alcohols are for example 1,2-ethanediol (ethyleneglycol), 1,2-propanediol, 1,3-propanediol, 1,2-butanediol, 1,4-butanediol, 2,2-dimethyl-1,3-propanediol (neopentylglycol), 1,6-hexanediol, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, polyethyleneglycols, dipropyleneglycol, tripropyleneglycol, polypropyleneglycols or 2,2-bis(hydroxymethyl)1-1-propanol (trimethylolethane), 2,2-bis-(hydroxymethyl)-1-butanol (trimethylolpropane), 1,2,4-butanetriol, 1,2,6-hexanetriol, 2,2-bis (hydroxymethyl)-1,3-propanediol (pentaerythritol) and 1,2,3,4,5,6-hexanehexol (sorbitol) and cyclohexanedimethanol.

The aliphatic diacids are for example malonic acid, succinic acid, glutaric acid, adipic acid, suberic acid and sebacic acid.

Among the mono-alcohols with a molecular weight of less than 300 with a double ethylene bond, hydroxyethyl acrylate or allyl alcohol are preferably selected.

The polyol component can further comprise, as necessary, a reticulating agent with a functionality greater than 2, such as a triol with a molecular weight of between 100 and 3,000.

The polymerization initiator used within the framework of the invention can be selected from among the photoinitiators when the polymerization of the layer is carried out under ultraviolet radiation or under electron radiation. It can also be a radical derivative capable of forming free radicals under the effect of a relatively low temperature, for example on the order of 60° C. Benzophenone, acetophenone or benzoin isobutylether may be used as the photoinitiator.

The adhesive layer can be formed in situ on one of the elements to be assembled. This adhesive layer can also be formed on a support to which it does not adhere strongly, in order to form a sheet which is detached from said casting suport and which is inserted between the elements to be assembled.

When the layer is formed directly on one of the elements to be assembled, the other element is preferably joined before the theoretical complete polymerization of the polyurethane, such that the adhesion takes place at the time of said polymerization.

When the adhesive layer is used for the assembly of a plastic layer with non-lacerating and selfrepairing properties mentioned above with a monolithic or laminated support, in glass or plastic, a sheet with two layers can preferably be manufactured in advance in the following manner.

The non-lacerating and self-repairing layer, which is preferably formed from a heat-hardenable polyurethane, is manufactured first of all and the second layer is formed on this first layer.

In this manner a heat-hardenable polyurethane layer can first of all be manufactured by pouring a mixture of the components on a casting support. After polymerization of the monomers and formation of a heat-hardenable layer with a thickness varying between 0.2 and 0.8 mm, the reaction composition capable of forming the adhesive layer is poured. The adhesive layer can have a thickness of between 0.01 and 1 mm dependent upon the desired application. The sheet is then detached from the support prior to total polymerization of the adhesive layer, in order to be joined to a glass or plastic substrate. The adhesion of the elements is carried out at the same time as the polymerization of the adhesive layer, by UV treatment or the like, where the adhesive layer contains a UV-sensitive initiator, or by heat treatment limited to cases where the adhesive layer contains an initiator of the radical derivative type.

When the adhesive layer is used for the assembly of the two layer sheet described in European Patent Publication No. 0 133 090, the same method can be used, by first forming the two component layers of the sheet and then the adhesive layer.

In this manner, safety glasses can be manufactured, such as glass for automobiles, in particular windshields, glass for buildings, protective eyeglasses, etc.

In an alternative embodiment, the polymerization of the adhesive layer can be carried out before assembly with the other glazing elements, while it is, for example, still on the sheet-forming support. At that time, the sheet is treated in an appropriate manner, for example by passage under UV radiation.

The adhesive layer can be formed by pouring the mixture of the compnents onto a support or, as indicated above, onto one of the elements to be assembled or, as necessary, onto both elements. The pouring can be carried out by means of a pouring head, such as that described for example in French Patent Publication No. 2 347 170. In an alternative embodiment, the adhesive layer can be formed by pulverization of the mixture of components. For this purpose centrifugal pulverization, using a rotor rotating at a speed of between 1,000 and 80,000 rpm, can be used.

Depending on the role of the adhesive layer in the assembly, it is possible to modify its mechanical properties by means of the degree of polymerization of the polyurethane, that is, by working on the lengths of the chains of said polymer. Thus, when the adhesive layer only has to act as an adhesive, it is not always necessary to carry out total polymerization of the polyurethane such as it could be theoretically when the starting composition contains a polymerization initiator. In this case, not all the double ethylene or acrylic bonds of the polyurethane chains will be made to react.

However, in general, total or almost total polymerization will be carried out by UV treatment or the like. This polymerization guarantees preservation of the adhesion over time.

If, in addition to an adhesive function, the adhesive layer must fulfill an energy absorption function, then a composition and a method of polymerization will be selected which provides longer chains by grafting chains to one another at the double ethylene bonds.

The adhesive layer in accordance with the invention is used for the manufacture of stratified glass or plastics, such as polycarbonate, polyamides, acrylics or polyurethanes.

For example, the adhesive layer in accordance with the invention is used for the manufacture of a laminated glass formed of two sheets of glass and and interpolated sheet with energy absorption properties. Adhesion to the two sheets of glass is provided on each side by an adhesive layer in accordance with the invention. The interpolated sheet can then be formed of polyvinylbutyral, crystal polyvinyl chloride, polyurethane, etc. This interpolated sheet need not, moreover, necssarily have specific adhesive properties.

The adhesive layer can also be used to directly bond the two sheets of glass of a laminated glass. At a thickness of approximately 0.4 mm and greater, it can act as an energy absorber.

The adhesive layer in accordance with the invention can further be used for the manufacture of a laminated safety glass comprising a sheet of glass, a layer of plastic with energy absorbing properties (EA layer), a non-lacerating and self-repairing layer, with the adhesive layer providing bonding of the glass sheet with the EA layer.

The adhesive layer in accordance with the invention can further be used for the manufacture of a safety glass formed by a monolithic or laminated glass or plastic support onto which, by means of the adhesive layer, a non-lacerating and self-repairing layer, as described above, is adhered.

The adhesive layer in accordance with the invention can further be used for the assembly of a sheet of glass with a sheet of polycarbonate or other plastic layers.

Other advantages and characteristics of the invention will become apparent from the following description of examples of embodiments and applications of the adhesive layer in accordance with the invention.

EXAMPLE 1

An acrylic polyurethane was prepared by mixing a polyol component formed from 28 g (0.0266 mole) of a polyesterdiol, 10.2 g (0.0122 mole) of a polycaprolactonediol with a molecular weight of 830, 15.4 g (0.0123 mole) of a polycaprolactonediol with a molecular weight of 1,250, 26.7 g (0.0267 mole) of a polyether with a molecular weight of 1,000, and 3 g (0.0027 mole) of a polyestertriol with a molecular weight of 1,100. Then 67 g (0.025 mole) of isophorone diisocyanate were added and this was reacted for 1.5 hours at 70° C. 18.5 g (0.16 mole) of hydroxyethyl acrylate and 0.93 g (0.005 mole) of benzophenone as the polymerization initiator were then added. This was reacted for 1 hour at 70° C. so as to form a polyurethane with an acrylic function. Acrylic acid was then added in order to lower the viscosity of the mixture and render it pourable.

The mixture was poured onto a glass sheet to form a colorless, homogeneous layer. A second sheet of glass was placed onto the formed layer and the assembly was subjected to electronic radiation which was sufficiently powerful to activate the double acrylic bond and increase the polymerization of the polyurethane.

Finally a laminated glass was obtained which had excellent adhesion between the elements and had a good optical quality.

EXAMPLE 2

The mixture described in Example 1 and capable of forming an acrylic polyurethane was poured into a previously formed heat-hardenable polyurethane layer as described in French Patent Publication No. 2 398 606. The two-layer sheet was assembled with a support composed of two sheets of glass and an interpolated layer of an energy absorber such as a polyvinylbutyral. The assembly was then subjected to UV treatment through the plastic sheet. The glass obtained was free from optical defects and the adhesion obtained between the elements was good.

EXAMPLE 3

The method of Example 1 was repeated except that the hydroxyethyl acrylate was replaced by allyl alcohol.

The mixture was poured onto a glass sheet to form a layer with a homogeneous thickness. Then a second sheet of glass was placed onto the formed layer and the assembly was subjected to UV treatment.

EXAMPLE 4

The method of Example 2 was repeated except that the hydroxyethyl acrylate was replaced by allyl alcohol.

EXAMPLE 5

The mixture capable of forming the acrylic polyurethane described in Example 1 was poured onto a plastic sheet formed from a thermoplastic polyurethane layer with energy absorption properties and heat-hardenable polyurethane layer with self-repairing and non-lacerating properties, for example the sheet described in European Patent Publication No. 0 133 090.

After formation of the adhesive layer, the threelayer sheet was joined to a sheet of glass by means of the adhesive layer and the assembly was subjected to UV treatment through the plastic sheet.

EXAMPLE 6

The method of Example 5 was repeated except that the mixture capable of forming the polyurethane layer was that described in Example 3.

What is claimed as new and desired to be secured by Letters Patent of the United States is:

1. An adhesive layer used in the manufacture of laminated glazings of glass and/or plastic, which comprises a polyurethane formed from an isocyanate selected from among the group consisting of aliphatic isocyanates, the cycloaliphatic isocyanates, the aliphatic-aromatic isocyanates which are not light-sensitive and which can contain urea functions, isocyanate biurets and mixtures thereof; a polyol component comprising at least one polyol selected from among the group consisting of polyetherpolyols or polyesterpolyols with a molecular weight of between 450 and 2000, polycaprolactones with a molecular weight of betwen 500 and 2000, polycarbonatepolyols or polyesterpolycarbonatepolyols with a molecular weight of between 1000 and 2000, polybutadienes with a hydroxyl or carboxyl function and mixtures thereof, at least one short diol with a molecular weight of between 50 and 200, at least one mono-alcohol with a molecular weight of less than 300 with a double ethylene bond in its formula and at least one polymerization initiator.

2. The adhesive layer in accordance with claim 1, wherein the mono-alcohol with a molecular weight of less than 300 is selected from the group consisting of hydroxyethyl acrylate and allyl alcohol.

3. The adhesive layer in accordance with one of claim 1, wherein the polymerization initiator is a photoinitiator or radical derivative.

4. The adhesive layer in accordance with claim 3, wherein the polymerization initiator is a photoinitiator and the layer is polymerized by UV or electronic radiation.

5. The adhesive layer in accordance with claim 1, wherein the polyol component comprises a reticulating agent with a functionality greater than 2.

6. The adhesive layer in accordance with claim 1, wherein it is formed on one of the elements of a laminated glass.

7. The adhesive layer in accordance with claim 1, wherein its polymerization is carried out in the assembly constituting the laminated glass.

8. A laminated glass comprising at least one adhesive layer in accordance with claim 7.

9. The laminated glass in accordance with claim 8, characterized in that it comprises a monolithic or laminated support and a non-lacerating and self-repairing layer adhered to the support by means of the adhesive layer.

10. The laminated glass in accordance with claim 8, characterized in that it comprises a monolithic or laminated support and a two-layer sheet of polyurethane, comprised of a non-lacerating and self-repairing layer and a layer with energy absorbing properties adhered to the support by means of the adhesive layer.

* * * * *